US005679941A

United States Patent [19]

Iizaka et al.

[11] Patent Number: 5,679,941

[45] Date of Patent: Oct. 21, 1997

[54] CHECKOUT DEVICE

[75] Inventors: Hitoshi Iizaka, Fuji; Masahito Sano; Yasuo Matsumoto, both of Numazu, all of Japan

[73] Assignee: Kabushiki Kaisha TEC, Shizuoka, Japan

[21] Appl. No.: 451,273

[22] Filed: May 30, 1995

[30] Foreign Application Priority Data

May 30, 1994 [JP] Japan .................................... 6-117199

[51] Int. Cl.$^{6}$ ..................................................... G06K 15/00

[52] U.S. Cl. ........................... 235/383; 235/437; 235/472

[58] Field of Search .................................... 235/383, 437, 235/472

[56] References Cited

U.S. PATENT DOCUMENTS 3,562,494 2/1971 Schmidt .................................. 235/437
4,610,361 9/1986 Elliot ......................................... 209/555
4,676,343 6/1987 Humble et al. .
4,920,255 4/1990 Gabeler ................................... 235/472
4,939,355 7/1990 Rando et al. .
5,497,314 3/1996 Novak ..................................... 235/383

FOREIGN PATENT DOCUMENTS 4-67291 3/1992 Japan .

*Primary Examiner*—Harold Pitts
*Attorney, Agent, or Firm*—Frishauf, Holtz, Goodman, Langer & Chick

[57] ABSTRACT

A checkout device including a conveying section for conveying an article in one direction, an optical scanner for scanning the article conveyed by the conveying section with a scanning light beam to read an article code affixed thereto, and a registration processing section for registering the article based on the article code read by the optical scanner. The optical scanner is provided with a variable scanning range to which the scanning light beam is applied, and the registration processing section includes control means for detecting physical features of the article conveyed by the conveying section and for controlling the scanning range of the optical scanner to be optimized for reading the article code affixed to the article based on a conveying position and the detected physical features of the article.

12 Claims, 9 Drawing Sheets

CHECKOUT DEVICE

BACKGROUND OF THE INVENTION

1. Field of the Invention

This invention relates to a checkout device for registering articles based on article codes affixed to the respective articles.

2. Description of the Related Art

In general, large-scale retail stores such as supermarkets utilize Point of Sales (POS) systems to enhance the rationalization of service. For example, Jpn. Pat. KOKAI Publication No. 4-67291 discloses a checkout device used in the POS system. In the checkout device, as shown in FIG. 1, a bar code scanner 1 is arranged between an entry conveyor 2 and an outfeed conveyor 3 and an electronic cash register 4 is disposed near one side of the outfeed conveyor 3. The bar code scanner 1 has a keyboard 1*a* for inputting an article code and a display 1*b* for displaying the result of inputting.

A customer 10 comes to the entry conveyor 2 side while pushing a shopping cart 11 containing articles to be purchased, places the articles on the entry conveyor 2 one by one, and then moves towards the outfeed conveyor 3 side as indicated by an arrow. The entry conveyor 2 sequentially conveys the articles placed by the customer 10 towards the bar code scanner 1. An article sensor 5 detects an article transported to an end position of the entry conveyor 2 which is adjacent to the bar code scanner 1. The entry conveyor 2 stops at the time of detection of the article and is driven again to convey the next article after the former article is taken up from the entry conveyor 2 by an operator 6. The operator 6 puts the article in a scanning range of the bar code scanner 1 so as to permit the bar code scanner to read the article code affixed to the taken-up article in the bar code form. If the article code is not affixed to the article or the bar code scanner 1 fails to read the article code, the article code is input to the bar code scanner 1 by use of the keyboard 1*a*. The outfeed conveyor 3 conveys the article placed thereon by the operator 6 in a direction away from the bar code scanner 1. The electronic cash register 4 registers the sold article based on the article code supplied from the bar code scanner 1, calculates the total amount of sales for all of the registered articles when the operator 8 operates a total key, and then issues a receipt having the total amount of sales printed thereon. The customer 10 makes payment for the articles to the operator 8, moves the purchased articles from the outfeed conveyor 3 into the shopping cart 11, and then leaves the checkout device. The driving speeds of the entry conveyor 2 and outfeed conveyor 3 can be adjusted by use of control switches 7 and 9 which are respectively disposed near the operators 6 and 8.

In the above checkout device, a partition rod 12 is used to separate the purchased articles for respective customers 10 and previously placed near the entry conveyor 2. The customer 10 puts the partition rod 12 on the entry conveyor 2 after all of the articles purchased by the customer are placed. The operator 6 moves the partition rod 12 from the entry conveyor 2 to the outfeed conveyor 3, and the operator 8 operates the total key of the electronic cash register 4 after confirming that the partition rod 12 is placed on the outfeed conveyor 3.

However, since the above checkout device is so constructed that two employees are engaged as operators for the bar code scanner 1 and the electronic cash register 4, it is sometimes difficult to increase the number of checkout devices when taking labor costs into consideration. Further, the above described conventional checkout device requires that a troublesome operation be performed. Namely, the conventional checkout device requires that the partition rod 12 which has been moved to the outfeed conveyor side must be moved back to the entry conveyor side.

SUMMARY OF THE INVENTION

An object of this invention is to provide a checkout device which can attain high reliability without requiring an operator for reading article codes.

The above object can be attained by a checkout device comprising a conveying section for conveying articles in one direction; an optical scanner for scanning the article conveyed by the conveying section with a scanning light beam to read an article code affixed thereto; and a registration processing section for registering the article based on the article code read by the optical scanner; wherein the registration processing section includes a control section for performing a control in which a scanning pattern of the optical scanner is optimized for physical features of the article conveyed by the conveying section.

In the above checkout device, the conveying section conveys articles via the optical scanner. Therefore, no operator is required for reading the article code. Further, the control section optimizes the scanning pattern of the optical scanner for physical features of an article conveyed by the conveying section. Therefore, so long as the article is not placed on the conveying section so as to hide the article code, the article code can be read from the article with high reliability even when the positional relation between the article and the optical scanner is changed due to an operation of the conveyor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

There will now be described a checkout device according to a first embodiment of this invention with reference to the accompanying drawings. For example, the checkout device is used in a POS system installed in a large-scale retail store such as a supermarket.

Figure 1:
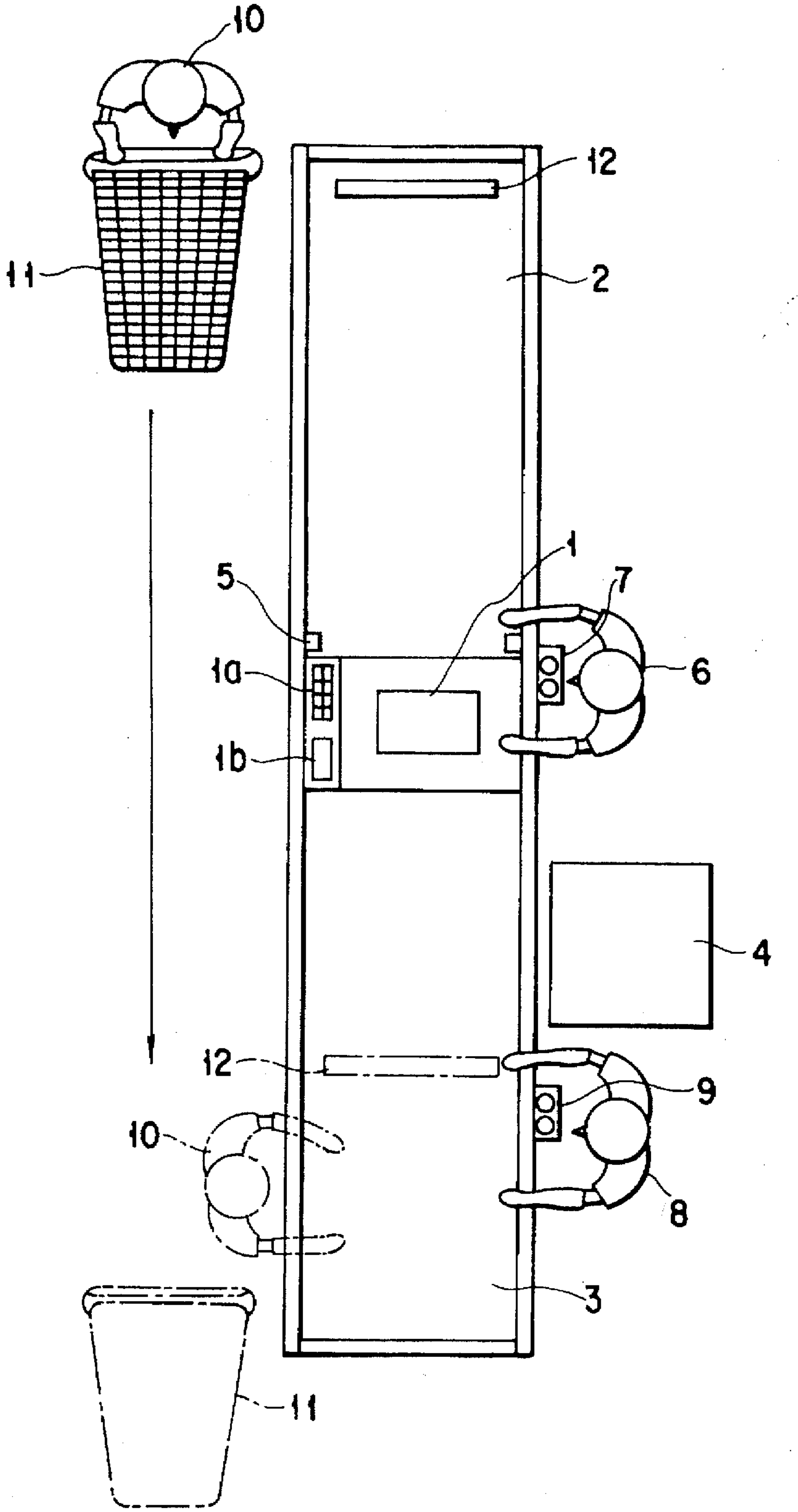
F I G. 1 (PRIOR ART)
FIG. 1 is a plan view showing a conventional checkout device.
Figure 2:
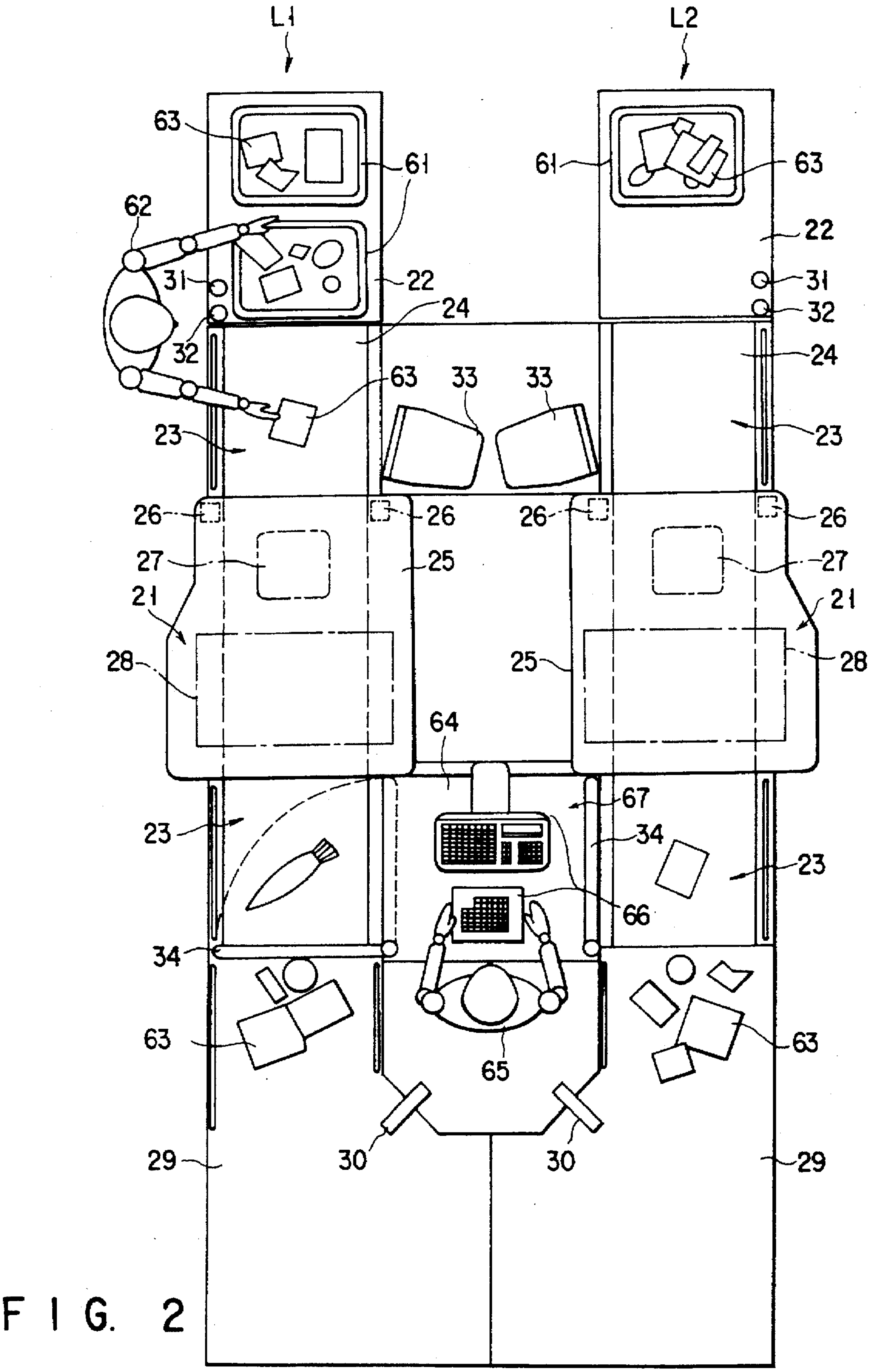
FIG. 2 is a plan view showing a checkout device according to a first embodiment of this invention.

FIG. 2 shows the plane structure of the checkout device. The checkout device has two checkout lanes L1 and L2 arranged substantially in parallel and an electronic cash register 67 disposed between the checkout lanes L1 and L2. Each of the checkout lanes L1 and L2 has an optical reading section 21, basket table 22, belt conveyor 23, article stacker 29, monitor display 30, start button 31, end button 32, guidance display 33, guidance speaker SP and article rejecting gate 34.

The basket table 22 is used to permit a basket 61 containing articles 63 to be placed thereon. The guidance display 33 and guidance speaker SP output a guidance message to a customer 62 in the form of image and voice, respectively. The start button 31 and end button 32 are operated by the customer 62 to instruct the start and end of the article registration, respectively. The belt conveyor 23 is laid between the basket table 22 and the article stacker 29 to convey the article 62 from the article placing area 24 near the basket table 22 towards the article stacker 29. A tunnel 25 partly covers the conveyor 23 on the downstream side from the article placing area 24. The optical reading section 21 is arranged in the tunnel 25 to detect the article 63 conveyed into the tunnel 25 by the belt conveyor 23 and read the article code affixed to the article 63 in the bar code form. The article rejecting gate 34 selectively rejects or discharges the article 63 conveyed out from the tunnel 25 by the belt conveyor 23 to an article table 64 adjacent to the belt conveyor 23. The article table 64 is formed as the upper surface of the electronic cash register 67 set at the same height as that of the belt conveyor 23, and the article rejecting gate 34 is formed as an arm which rotates around a shaft set at a boundary position between the belt conveyor 23 and the article table 64. At the time of operation of the article rejecting gate 34, the arm is temporarily set at right angles to the belt conveyor 23 and returned to the home angle at which it is set in parallel to the belt conveyor 23. The article 63 is swept from the belt conveyor 23 to the article table 64 by the movement of the arm. The article stacker 29 stores the article 63 which is not discharged by the article rejecting gate 34.

Figure 3:
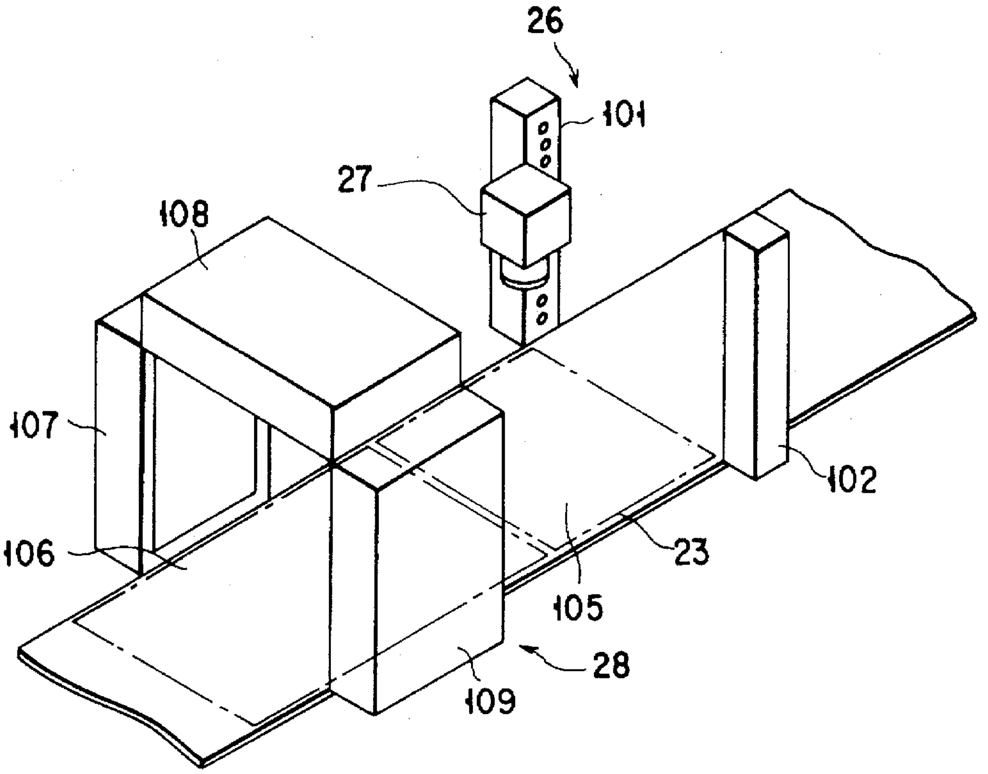
FIG. 3 is a perspective view showing an optical reading section of FIG. 2 in more detail.

The optical reading section 21 includes a height measuring unit 26, video camera 27 and bar code scanner 28 arranged as shown in FIG. 3. The height measuring unit 26 measures the height of the article 63 conveyed into the tunnel 25. The video camera 27 obtains an image of the article 63 which has passed the height measuring unit 26. The bar code scanner 28 scans the article 63 which has passed the video camera 27 by use of a laser beam, and photoelectrically converting the laser beam reflected from the article 63 to read the article code in the bar code form.

Figure 4:
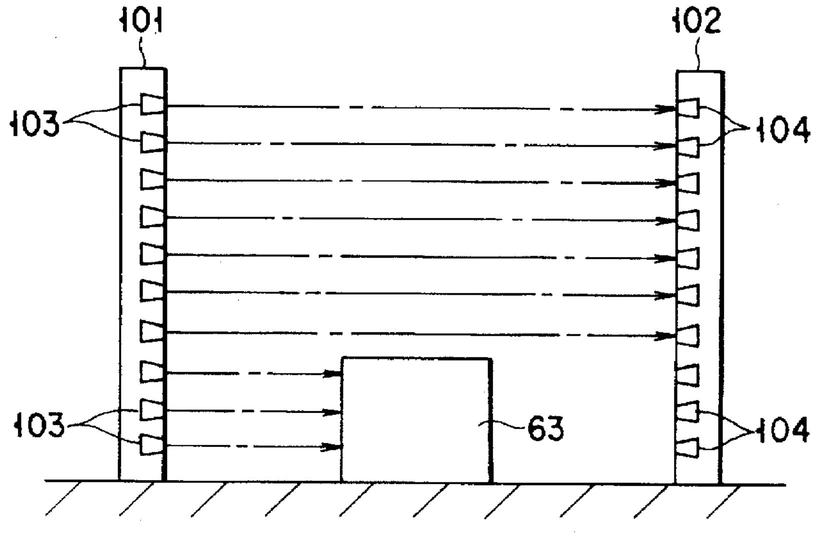
FIG. 4 a cross sectional view showing a height measuring unit shown in FIG. 3 in more detail.

The height measuring unit 26 has two supporting poles 101 and 102 disposed on both sides Of the belt conveyor 23. As shown in FIG. 4, the supporting pole 101 has a plurality of light emitting elements 103 arranged at a preset pitch and the supporting pole 102 has a plurality of light receiving elements 104 arranged at a preset pitch. The light emitting element 103 is formed of LED or the like, and the light receiving element is formed of phototransistor, photodiode or the like. The supporting poles 101 and 102 are vertically fixed so that the light emitting elements 103 will face the corresponding light receiving elements 104. With this arrangement, light beams emitted from the light emitting elements 103 cross the space above the belt conveyor 23 and are made incident on the corresponding light receiving elements 104. The height measuring unit 26 measures the height of the article 63 based on the number of those light receiving elements 104 which do not receive the light beams because of interruption of the light beams by the article when the article 63 crosses a curtain of the light beams and outputs height data corresponding to the result of measurement.

The video camera 27 is fixed directly above the belt conveyor 23 to monitor an image input area 105 set between the height measuring unit 26 and the bar code scanner 28 and outputs image data which will be subjected to the image processing to obtain a color image of the article 63 lying in the image input area 105. The video camera 27 cooperates with the height measuring unit 26 to detect that the article 63 is conveyed into the tunnel 25. The entry of the article is detected when at least one of the height data from the height measuring unit 26 and image data from the video camera 27 is changed from the data obtained in the normal state.

As shown in FIG. 3, the bar code scanner 28 has variable scanning optical systems 107, 108 and 109 disposed on both sides of and above the belt conveyor 23. The variable scanning optical systems 107, 108 and 109 cooperate to scan the article 63 passing a scanning area 106 set on the downstream side from the image input area 105 by use of a laser beam. The laser beam is generated by use of a laser light source such as a laser tube or semiconductor laser device. The bar code scanner 28 is constructed to adjust the optical length, focal distance and scanning pattern of the variable scanning optical systems 107, 108 and 109 according to the control from the exterior.

The electronic cash register 4 is operated by an operator 65 or cashier stationed between the checkout lanes L1 and L2 and is used as a POS terminal for registering sold articles for each of the checkout lanes L1 and L2.

Figure 5:
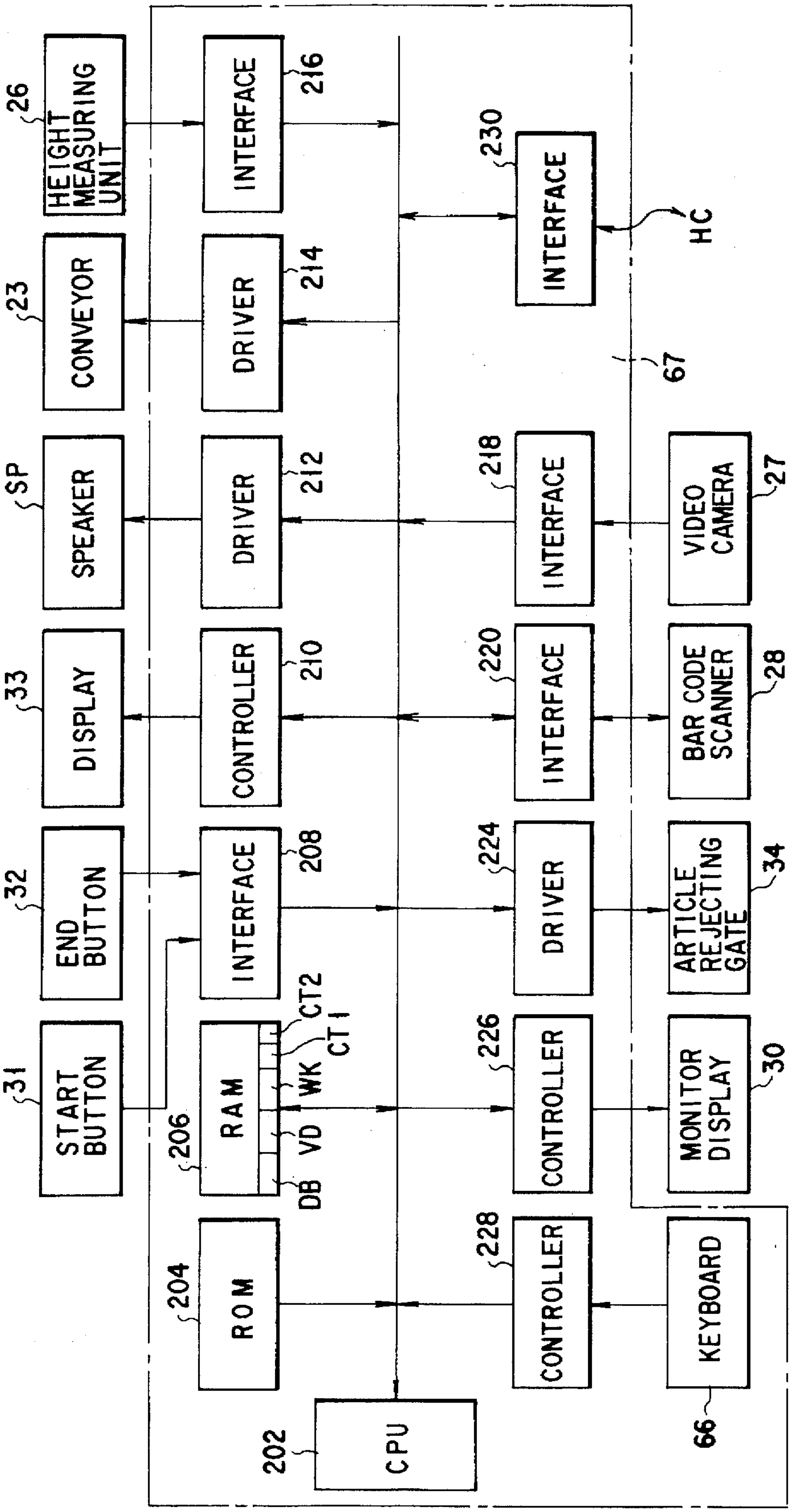
FIG. 5 is a block diagram showing a control circuit of the checkout device shown in FIG. 2.

The electronic cash register 4 includes a CPU 202, ROM 204, RAM 206, interfaces 208, 216, 218, 220 and 230, controllers 210, 226 and 228 and drivers 212, 214 and 224, which are interconnected as shown in FIG. 5. The controller 228 is connected to a keyboard 66. The interface 230 is connected to a host computer HC via a communication line. The interface 208 is connected to the start button 31 and end button 32 of each of the lanes L1 and L2. The controller 210 is connected to the guide display 33 of each of the lanes L1 and L2. The driver 212 is connected to the guide speaker SP of each of the lanes L1 and L2. The driver 214 is connected to the belt conveyor 23 of each of the lanes L1 and L2. The interface 216 is connected to the height measuring unit 26 of each of the lanes L1 and L2. The interface 218 is Connected to the video camera 27 of each of the lanes L1 and L2. The interface 220 is connected to the bar code scanner 28 of each of the lanes L1 and L2. The driver 224 is connected to the article rejecting gate 34 of each of the lanes L1 and L2. The controller 226 is connected to the monitor display 30 of each of the lanes L1 and L2 (in FIG. 5, for simplicity, the components of the lane L2 are omitted and only the components of the lane L1 are shown).

The CPU 202 controls the whole operations of the electronic cash register 4 and the checkout lanes L1 and L2. The ROM 204 stores fixed data such as printing character font, display character font and the control program of the CPU 202, and the RAM 206 stores various data input to or output from the CPU 202. Specifically, the RAM 206 has a data base area for storing article data, feature data and sales data of various articles as a data base DB, a video memory area for storing image data VD, a work area for storing various guidance messages, height data, read article codes, key input article codes, and other work data WK, a counter area constructing a first counter CT1 for counting the number of conveyed-in articles, and a counter area constructing a second counter CT2 for counting the number of registered articles. The article data represents the article code, article name, unit price and the like, the feature data represents features of items such as the size (including the projected area), shape and color. The feature of color is represented by monochromatic information, color component information representing red, green and blue, chromatic information representing hue, brightness and chroma, or other information. The feature data may be omitted in some cases, for example, the feature data for fresh provisions may be omitted.

The interface 218 receives the data base DB supplied from the host computer HC to store the same into the data base area of the RAM 206. The interface 218 receives the start instruction and end instruction of the article registration respectively supplied from the start button 31 and end button 32. The controller 210 controls the guidance display 33 to output an image of the guidance message. The driver 212 drives the speaker SP to output a voice of guidance message. The driver 214 drives the belt conveyor 23. The interface 216 receives height data supplied from the height measuring unit 26 to store the same into the work area of the RAM 206. The interface 218 receives image data VD supplied from the video camera 27 to store the same into the video memory area. The interface 220 receives a read article code supplied from the bar code scanner 28 to store the same into the work area of the RAM 206. The driver 224 drives the article rejecting gate 34. The controller 226 drives the monitor display 30 to output the total amount for sold articles. The controller 228 receives an article code and other input data supplied from the keyboard 66. The keyboard 66 has a plurality of key pads for generating different article codes. Further, the controller 228 can be connected to a small-sized stationary scanner, touch scanner or pen scanner in addition to the keyboard 66.

An operation of the above checkout device is explained below.

Figure 6A:
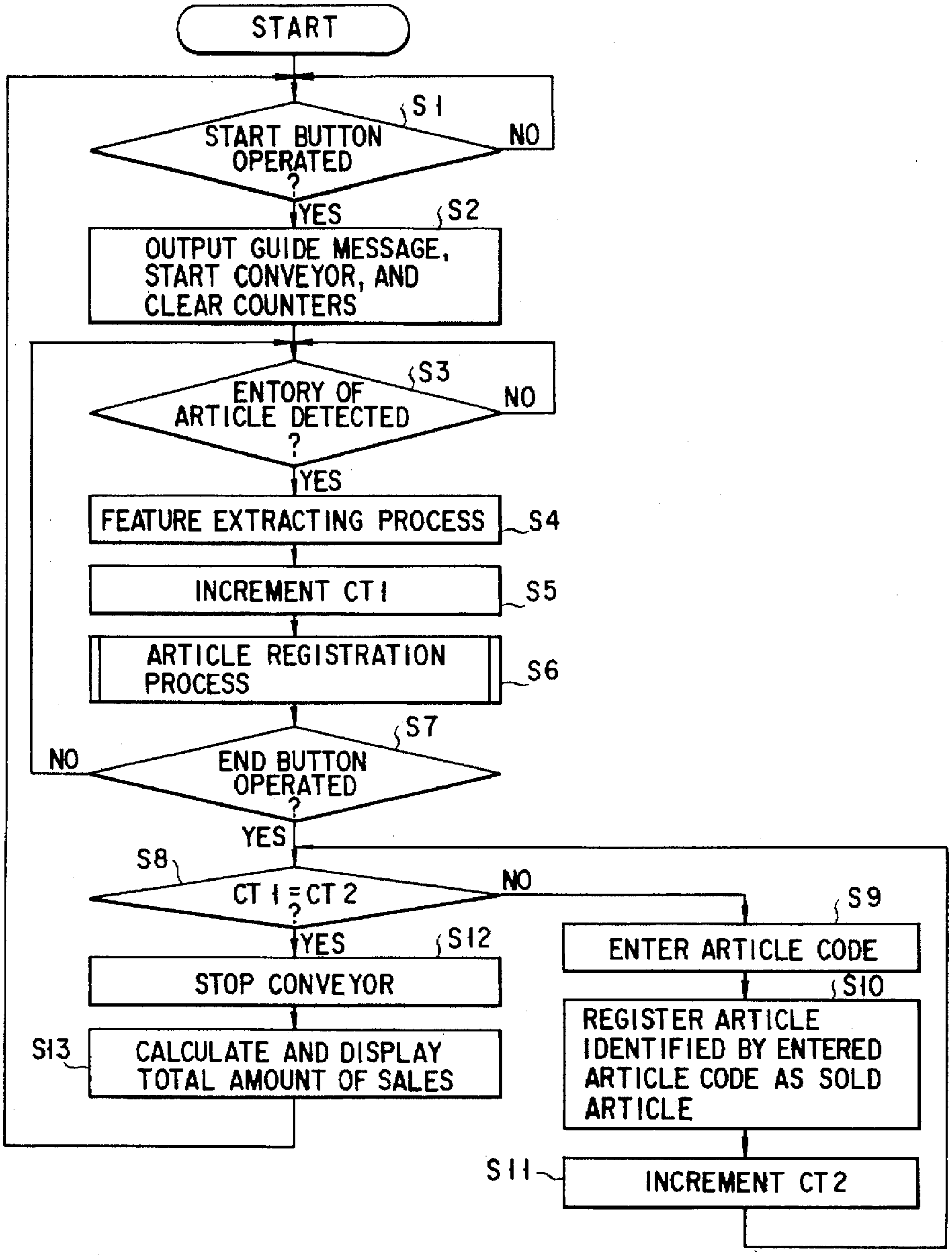
FIG. 6A is a flow chart for illustrating an operation of the checkout device shown in FIG. 2.

When electric power is supplied to the checkout device, the CPU 202 executes the control program stored in the ROM 204 to perform a control process shown in FIG. 6A for each of the checkout lanes L1 and L2 in a time-sharing fashion, for example.

If the components are initialized at the starting time of the process, whether the start button 31 is depressed or not is repeatedly checked in the step S1. If it is detected that the start button 31 is depressed, the CPU 202 performs in the step S2 a control of causing the display 33 and speaker SP to output guidance messages, driving the belt conveyor 23, and clearing the contents of the counters CT1 and CT2. Then, the step S3 is repeatedly executed to check whether the entry of the article is detected or not. If the entry of the article is detected based on a change in at least one of height data from the height measuring unit 26 and image data from the video camera 27, the feature extraction process is performed in the step S4.

In the feature extraction process, the CPU 202 extracts physical features of the article placed on the conveyor from the height data generated by the height measuring unit 26 and the image data generated by the video camera 27. The physical features of the article include not only the feature items such as the size, shape and color but also the feature items such as the location, height and bar code position in the image input area 105. The location of the article is determined by taking the orientation and inclination of the article into consideration. Further, the CPU 202 determines the effective scanning range based on the article conveying position and the above physical features, and determines the optimum optical length, focal distance and scanning pattern of each of the variable scanning optical systems 107, 108 and 109 in order to scan the effective scanning range.

After the feature extraction process, the CPU 202 increments the content of the counter CT1 by "1" in the step S5, performs an article registration process in the step S6, and checks in the step S7 whether the end button 32 is depressed or not. If it is detected that the end button 32 is not depressed, the steps S3 to S7 are repeatedly executed for article registration. On the other hand, if it is detected that the end button 32 is depressed, whether or not CT1 (the number of conveyed-in articles) is equal to CT2 (the number of registered articles) is checked in the step S8. If the compared two values are not equal to each other, the CPU 202 enables an article code to be entered from the keyboard 66 in the step S9, registers an article identified by the entered article code as a sold article in the step S10, and increments the content of the counter CT2 by "1" in the step S11. If it is detected in the step S8 that CT1 is equal to CT2, the belt conveyor 23 is stopped in the step S12, the CPU 202 calculates the total sales amount in the step S13 and displays the same on the display 30. After display of the total sales amount, the step S1 is executed again for the next checkout.

Figure 6B:
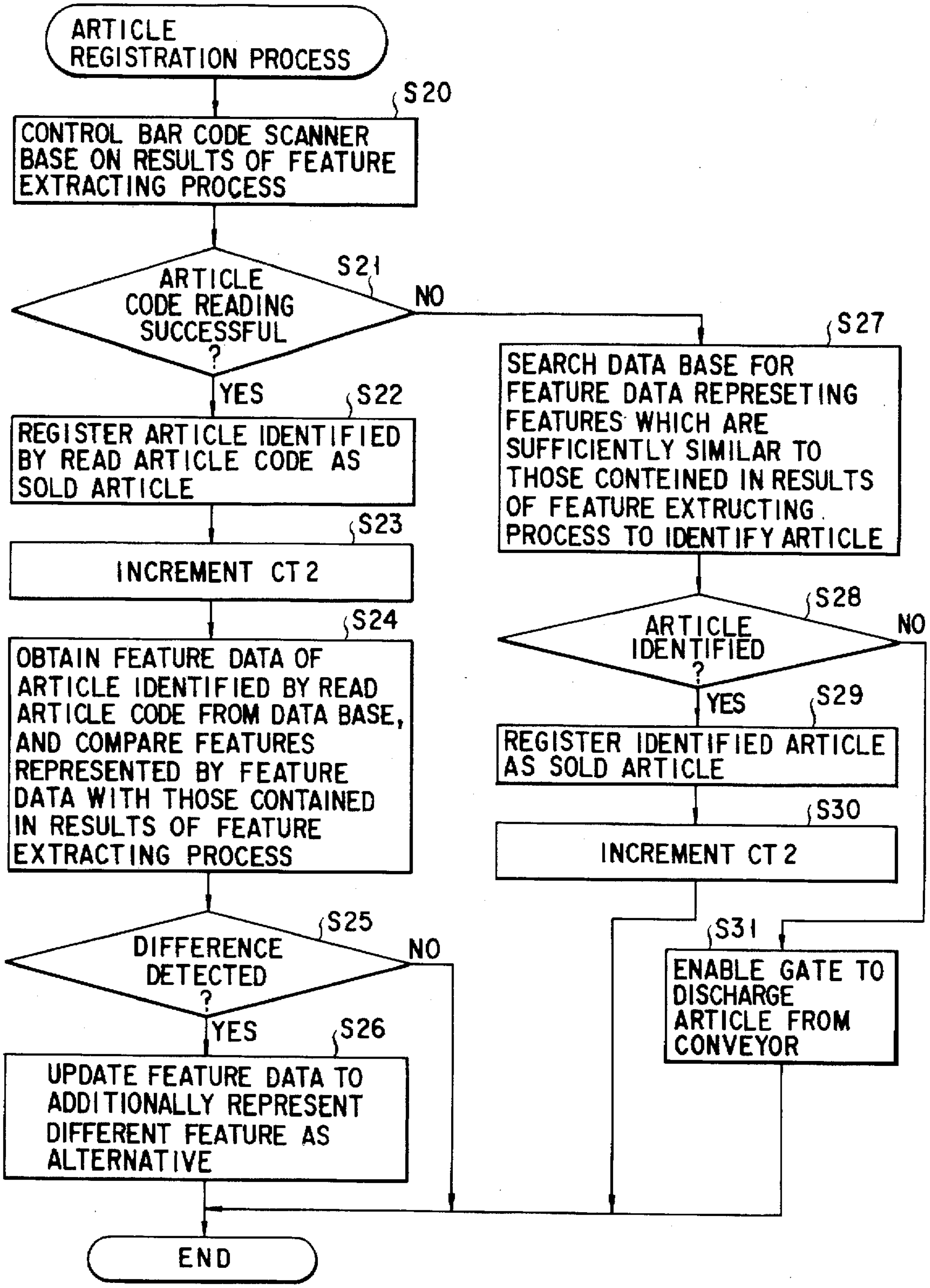
FIG. 6B is a flow chart for illustrating an article registration process shown in FIG. 6A.

FIG. 6B shows the article registration process performed in the step S6 in more detail.

If the article registration process is started, the bar code scanner 28 is controlled based on the results of the feature extraction process. Then, the optical length, focal distance and scanning pattern of each of the variable scanning optical systems 107, 108 and 109 of the bar code scanner 28 are set to optimum values to scan the effective scanning area of the article passing through the scanning area 106. Thus, the bar code scanner 28 reads the article code affixed to the article in the bar code form with high probability. In the succeeding step S21, whether the bar code scanner 28 successfully has read the article code or not is checked. If it is detected that the article code reading is successful, the CPU 202 registers an article identified by the read article code as a sold article in the step S22 and increments the content of the counter CT2 by "1" in the step S23. After this, the CPU 202 obtains feature data of the article identified by the read article code from the data base in the step S24 and compares the features represented by the feature data with corresponding features contained in the results of the feature extraction process. In the step S25, whether or not there is a difference between the compared features is checked. If there is no difference between them, the article registration process is terminated.

On the other hand, if there is a difference between them, the feature data is changed in the data base to additionally represent the different feature as a selectable feature in the step S26 and the article registration process is terminated after the step S26.

If it is detected in the step S21 that the bar code scanner 28 fails to read the article code, the CPU 202 informs the operator of the electronic cash register 4 of the failure by use of a lamp, for example, and searches the data base for feature data representing features which are sufficiently similar to the features contained in the results of the feature extraction process to identify the article. In the step S28, whether or not the article is identified in the step S27 is checked. If the article has been identified, the identified article is registered as a sold article in the step S29 and the content of the counter CT2 is incremented by "1" in the step S30. The article registration process is terminated after the step S30. On the other hand, if it is detected in the step S28 that the article is not identified, the CPU 202 drives the article rejecting gate to discharge the article from the belt conveyor 23 in the step S31 and then terminates the article registration process.

In the checkout device of the above embodiment, the customer 62 goes to the first checkout lane L1 as shown in FIG. 2, for example, and then places the basket 61 containing articles to be purchased, on the basket table 22. At this time, the guidance display 33 previously displays the guidance message suggesting that the start button 31 should be depressed to start the checkout operation. The guidance message is also informed to the customer 62 in a voice.

When the customer 62 depresses the start button 31 according to the guidance, the belt conveyor 23 is driven and the guidance message is transmitted to the customer 62 by display and voice to instruct the customer 62 to place the article 63 on the placing area 24 of the belt conveyor 23 with the bar code set to face upward or sideways. The customer 62 takes out articles 63 one by one from the basket 61, recognizes the position of the bar code affixed to the article 63, and places the article 63 in the specified position on the placing area 24. The guidance display 33 and speaker SP also inform that the end button 32 should be depressed when all of the articles 63 to be purchased are placed.

The article 63 on the placing area 24 is conveyed into the tunnel 25 by the belt conveyor 23. In the tunnel 25, the height of the article 63 is measured by the height measuring unit 26, the image of the article 23 is obtained by the video camera 27, and the effective scanning area of the article 23 is scanned by the bar code scanner 28. When the article code is derived from the bar code scanner 28, the electronic cash register 4 registers an article identified by the article code as a sold article, and when the article code cannot be derived, it registers the article as a sold article by extracting physical features of the article 63 from data derived by the height measuring unit 26 and video camera 27 and searching the data base for feature data representing features which are sufficiently similar to the extracted features.

When the unregistered article 63 is conveyed out from the tunnel 25, the article rejecting gate 34 discharges the unregistered article 63 from the belt conveyor 23 to the article table 64. Further, when the registered article 63 is conveyed out from the tunnel 25, the registered article is conveyed to the article stacker 29 without being discharged by the article rejecting gate 34.

The unregistered article 63 is taken out from the article table 64 by the operator 65, and after registered by use of the keyboard 66, it is placed back on the belt conveyor 23.

When the customer 62 depresses the end button 32 after placing all of the purchased articles 63 on the placing area 24, the guidance display 33 and speaker SP instruct the customer 62 to move forward with the empty basket 61 by display and voice. The display 30 displays the total amount for all of the sold articles for the customer 62.

The customer 62 recognizes the amount of payment based on the display content of the display 30 and pays money for the amount to the operator 65. For example, the operator 65 issues a receipt using a printer and puts the money paid by the customer into a drawer. The customer 62 puts the articles 63 stored on the stacker 29 into a bag after the payment and leaves the checkout device.

In the above embodiment, a case wherein the checkout device performs the registration of articles sold to the customer on the checkout lane L1 side is explained, but the checkout device performs the registration of articles sold to a customer on the checkout lane L2 side in the same manner as described above.

Further, since the electronic cash register 4 is commonly used for the checkout lanes L1 and L2, the operator 65 selects one of the checkout lanes L1 and L2 by operation of the keyboard 66.

It is also possible to use an automatic bagging machine to automatically put articles into a bag instead of bagging by the customer. In this case, the article stacker 29 becomes unnecessary and articles are automatically put into a bag from the belt conveyor 23.

Further, the checkout device can be so designed as to register physical features for identification of an article into the data base, for example, by using a small-sized camera which obtains the image of an unregistered article supplied to the operator 65 for registration and inputs the image to the electronic cash register 4 as image data.

In the checkout device of the above embodiment, the belt conveyor 23 conveys the article to pass the bar code scanner 28. Therefore, no operator is required for reading the article code. Further, the height measuring unit 26, video camera 27 and CPU 202 are used to detect the physical features of the article 63 placed on the belt conveyor 23 and optimize at least the scanning pattern of the bar code scanner 28 based on the detected physical features. Therefore, if the article 63 is placed on the belt conveyor 23 with the article code exposed to the outside, the article code of the article can be read with high reliability even when the positional relation between the article 63 and the bar code scanner 28 is changed with the movement of the belt conveyor 23.

Even if the bar code scanner 28 fails to read the article code, the checkout device can identify an article by comparing the features derived from the data produced by the height measuring unit 26 and the video camera 27 with those contained in the data base. Therefore, it is possible to reduce the number of articles to be supplied to the operator 65 for registration.

Further, in the checkout device, no conventional partition rod is required since customers can be separated from each other by use of the start and end buttons 31 and 32.

Figure 7:
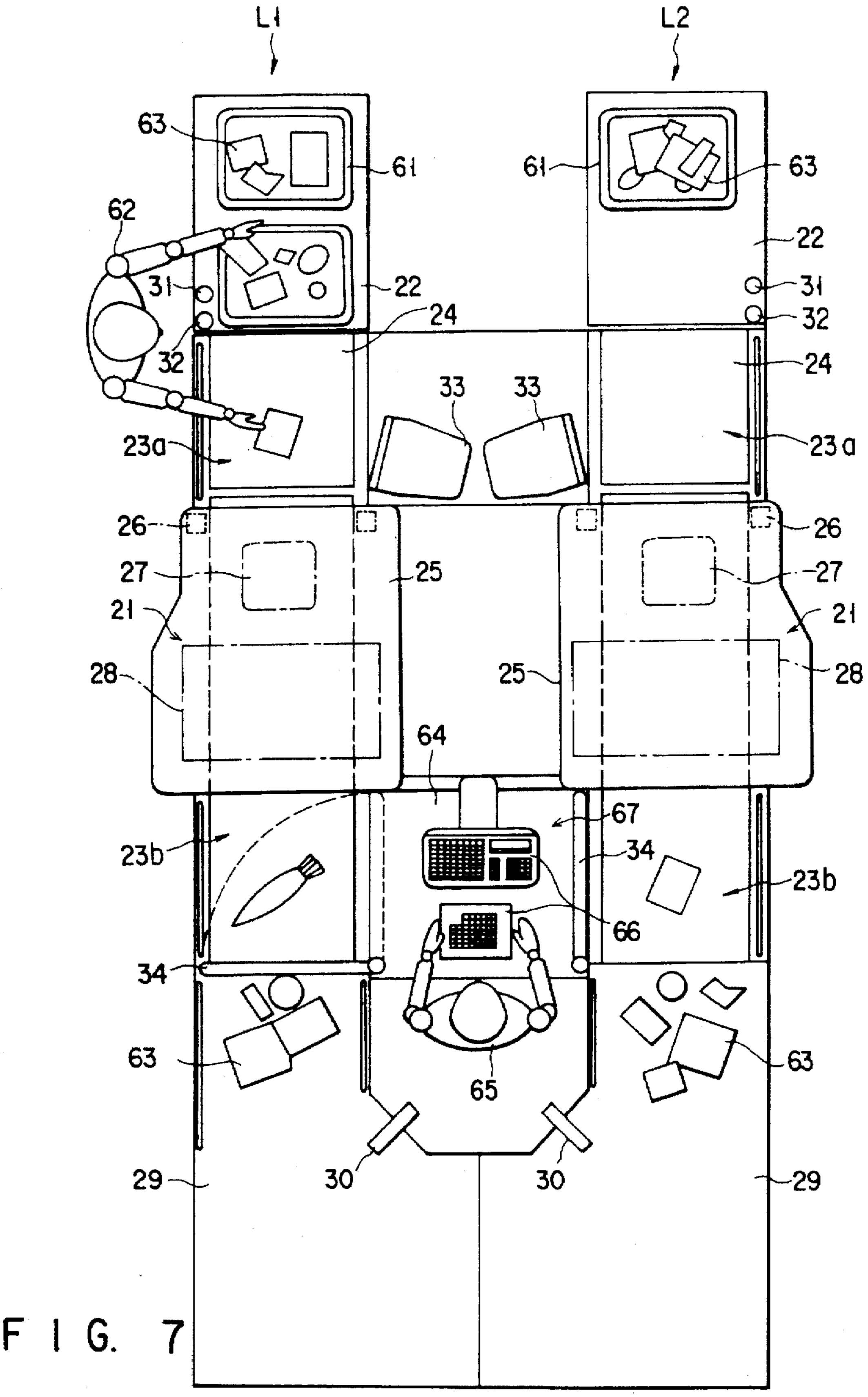
FIG. 7 is a plan view showing a checkout device according to a second embodiment of this invention.

A checkout device according to a second embodiment of the present invention will be described with reference to FIG. 7. The arrangement of the checkout device is similar to that in the first embodiment except the following points. In FIG. 7, similar components are represented by the same numerals so as to omit repetitive description.

In the checkout device, the belt conveyor 23 of each checkout lane is formed of an entry belt conveyor **23*a* and an outfeed belt conveyor 23*b* which are arranged in series between the basket table 22 and the article stacker 29. The speeds of the belt conveyors 23*a* and 23*b*** can be controlled independently.

The article placing area 24 is set on the entry belt conveyor 23*a*, and the tunnel 25 is set to partly cover the outfeed belt conveyor 23*b*. The entry belt conveyor 23*a* conveys an article from the article placing area 24 to the entrance of the tunnel 25, and the outfeed belt conveyor 23*b* conveys the article from the entrance of the tunnel 25 to the article stacker 29.

The speed of the entry belt conveyor 23*a* is normally set such that the customer 62 can easily place an article 63, and the speed of the outfeed belt conveyor 23*b* is set equal to or higher than that of the entry belt conveyor 23. In a case where the article 63 has a large surface area, it is difficult to determine the position of the bar code affixed to the article 23 in the image processing of the image data from the video camera 27. In this case, the bar code scanner 28 takes a long period of time to read the bar code. Accordingly, the speed of the outfeed belt conveyor 23*b* is temporarily decreased so that the article 63 can pass the scanning area 106 slowly. When the next article is conveyed into the tunnel 25 by the conveyor 23*a*, the next article is detected by means of the height measuring unit 26 and the video camera 27. At this time, the CPU 202 performs a control of terminating the reading operation currently performed by the bar code scanner 28, increasing the speed of the outfeed belt conveyor 23*b* to the normal state, and driving the article rejecting gate 34 so as to discharge the former article 63 whose article code has not been read to the article table 64 from the outfeed conveyor 23*b* after the article is conveyed out from the tunnel 25. When the article code is successfully read by the bar code scanner 28 before detection of the next article, the speed of the outfeed conveyor 23*b* is increased to the normal state immediately.

If the customer hesitates to place the next article on the article placing area 24, the placement of this article is delayed and the former article 63 may reach the article stacker 29 or the article table 64 before the next article is detected by means of the height measuring unit 26 and the video camera 27. In this case, the entry belt conveyor 23*a* is temporarily set at a higher speed after confirming that the end button 32 has not been depressed, and resumed to the normal speed when the next article is detected by means of the height measuring unit 26 and the video camera 27. Thus, the time for conveying the article 63 can be shortened without reducing the reliability in the reading operation of the bar code scanner 28.

When the end button 32 is detected to be depressed, the speeds of the entry and outfeed conveyors 23*a* and 23*b* are increased so that the registration of article 63 conveyed by these conveyors 23*a* and 23*b* can be completed earlier.

According to the second embodiment, the same effects as described in the first embodiment can be obtained. In addition, the article 63 can be conveyed at a more appropriate speed.

Figure 8:
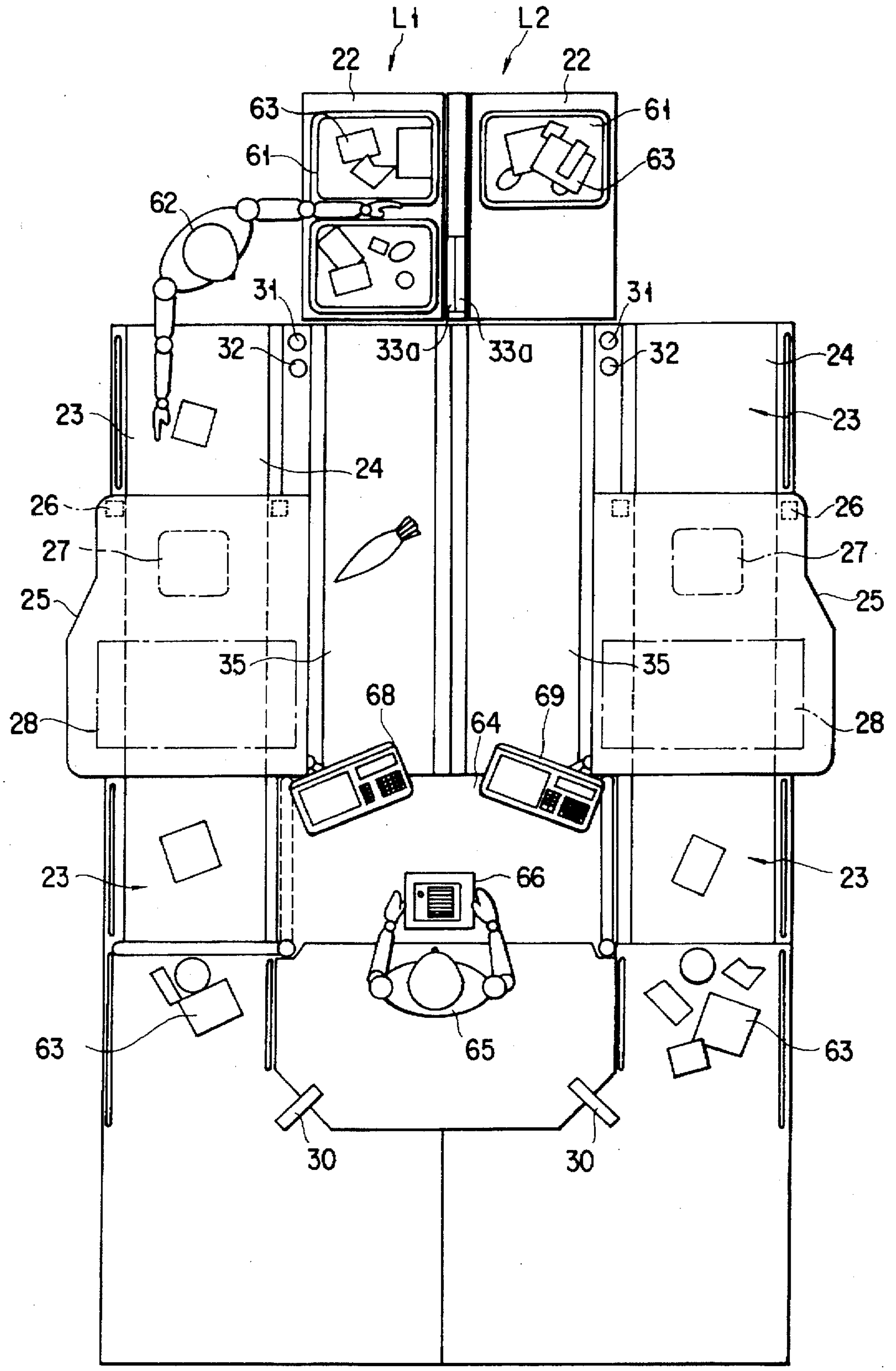
FIG. 8 is a plan view showing a checkout device according to third embodiment of this invention.

Next, a checkout device according to a third embodiment of the present invention will be described with reference to FIG. 8. The arrangement of the checkout device is similar to that in the first embodiment except the following points. In FIG. 8, similar components are represented by the same numerals so as to omit repetitive description.

In the checkout device, each of the checkout lanes L1 and L2 further includes an subsidiary belt conveyor 35. The basket table 22 is disposed in the vicinity of an end of the belt conveyor 35. A guidance display 33*a* of a panel type is provided instead of the guidance display 33 shown in FIG. 2. The subsidiary belt conveyor 35 is used for directly conveying to the article table 64 an article who has no article code affixed thereto in the bar code form.

The customer 62 checks whether the article 63 taken out from the basket 61 has a bar code affixed thereto, and places the article 63 on the belt conveyor 23 when the article 63 has the bar code and on the subsidiary belt conveyor 35 when the article has no bar code. After the conveyor 35 has conveyed the article 63 to the article table 64, the article 63 is taken out for registration by the operator 65.

Further, the electronic cash register 67 includes POS keyboards 68 and 69 assigned to the checkout lanes L1 and L2. The keyboards 68 and 69 are mounted on the upper edge portions of the corresponding tunnels 25. A printer and drawer are disposed under the article table 64.

According to the third embodiment, the same effects as described in the first embodiment can be obtained. Further, the article registration can be effected without a unnecessary time delay since the bar code scanner 28 does not scan an article who has no bar code. Thus, operation efficiency in the article registration can be enhanced. Moreover, since the keyboards 68 and 69 are mounted on the upper edge portions of the corresponding tunnels 25, these keyboards 68 and 69 do not serve as obstacles to the articles conveyed to the article table 64.

Figure 9:
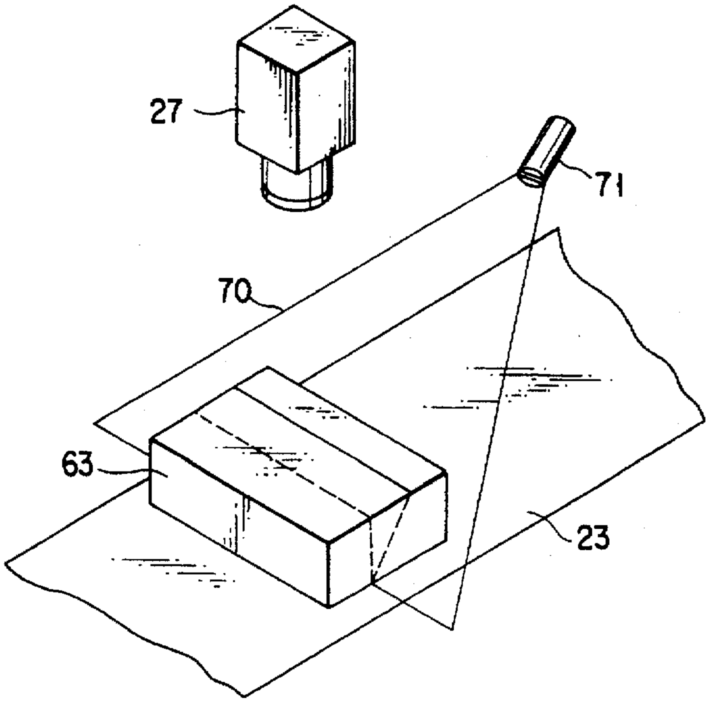
FIG. 9 is a perspective view showing a first modification of the height measuring unit used in each of the above embodiments.

In the first to third embodiments, the checkout device uses the height measuring unit 26 shown in FIG. 4. However, this unit 26 is not required if a light source 71 shown in FIG. 9 is provided, for example. The light source 71 has a slit through which light 70 is emitted. The light 70 spreads to form a bright line extending across the belt conveyor 23, and is applied in an oblique direction with respect to the article 63 conveyed by the belt conveyor 23. In this case, the height of the article 63 is measured under association of the light source 71 and the video camera 27.

Figure 10:
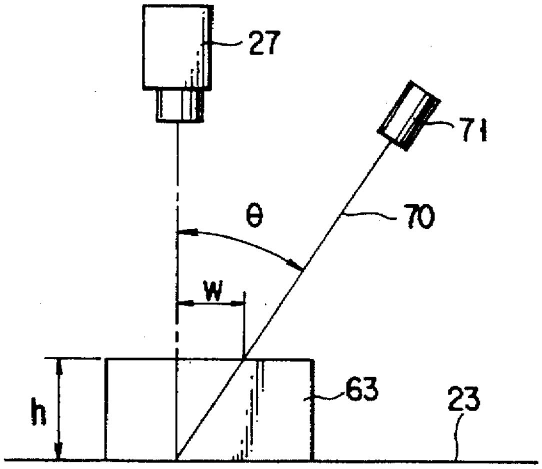
FIG. 10 is a side view showing the first modification shown in FIG. 9.
Figure 11:
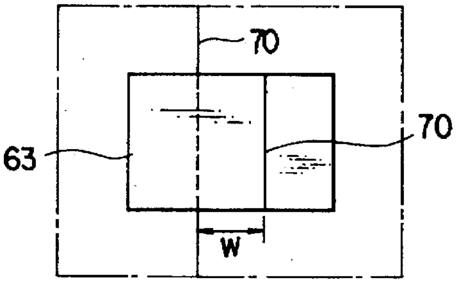
FIG. 11 shows an image for height measurement obtained by a video camera shown in FIG. 9.

That is, as shown in FIG. 10, if the light 70 is inclined at a preset angle 0 with respect to the central axis of the video camera 30, the distance w between a bright line formed by part of the light 70 projected on the upper surface of the article 63 and a bright line formed by part of the light 70 projected on the belt conveyor 24 varies with the height of the article 63. In other words, the height h of the article 26 can be represented by $h=w/\tan\theta$. As shown in FIG. 11, the value of the distance w can be derived from 2-dimensional image data obtained by the video camera 30 and the height h of the article 26 can be calculated by incorporating the value of the distance w into the above equation.

Therefore, it is not necessary to measure the height of the article 63 independently of the processing of 2-dimensional image data from the video camera 27. Further, with this height measuring scheme, the height of the article 63 can be more precisely measured as compared with each of the above embodiments, and therefore, the variable scanning optical systems 107, 108, and 109 of the bar code scanner 28 can be more appropriately adjusted. As a result, the reliability of the reading operation can be enhanced. Further, since the light 70 is applied to the article 63 in the oblique direction, it is possible to estimate a 3-dimensional image thereof. Accordingly, the possibility that the article 63 is identified using the data base can be increased.

Figure 12:
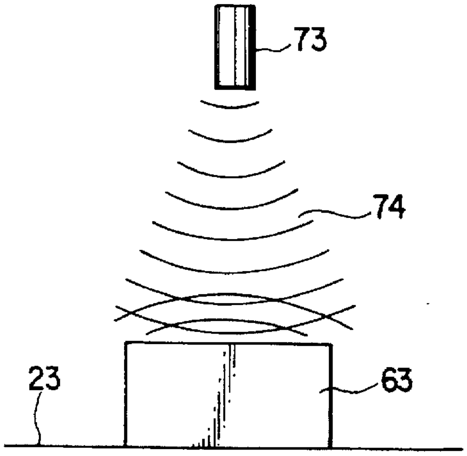
FIG. 12 is a side view showing a second modification of the height measuring unit used in each of the above embodiments.

Further, the height measuring unit 26 in each embodiment may be replaced by an ultrasonic sensor head 73 shown in FIG. 12, for example. This ultrasonic sensor head 73 radiates an ultrasonic wave 74 towards the belt conveyor 23 and measures the height of the article 63 based on the phase difference between the radiated ultrasonic wave 74 and the ultrasonic wave reflected from the upper surface of the article 63.

In each embodiment, the height measuring unit 26 has two supporting poles 101 and 102 arranged such that a plurality of light emitting elements 103 face to a plurality of light receiving elements 104. However, the arrangement of the supporting poles 101 and 102 can be changed by using a reflection plate which reflects lights from the light emitting elements 103 to the light receiving elements 104. Further, the light emitting elements 103 and the light receiving elements 104 can be formed on one of two supporting poles 101 and 102. In this case, the other pole is eliminated.

Further, in each embodiment, the first and second counters CT1 and CT2 are provided to count the number of conveyed-in articles and the number of registered articles. The content of the first counter CT1 is cleared when the start button 31 is depressed, and the content of the second counter CT2 is cleared when article registration for one customer is completed. Therefore, article registration for the next customer must be started after article registration for the preceding customer has been completed. However, if the checkout device has additional counters used instead of the counters CT1 and CT2 being occupied, the article registration for the next customer can be started without awaiting completion of the article registration for the preceding customer.

Further, the first and second counters CT1 and CT2 can be replaced by a single up-down counter which is incremented upon detection of a conveyed-in article and decremented upon registration of an article. In this case, the article registration for one customer is terminated after confirming that the end button 32 has been depressed and the content of the up-down counter is "0". In addition, if another up-down counter is provided, the article registration for the next customer can be started without awaiting completion of the article registration for the preceding customer.

Further, in each embodiment, the belt conveyor 23 is used to convey articles. However, the article can be transported by a pallet type or roller conveyor type transporting device, for example.

Moreover, in each embodiment, the checkout device includes two checkout lanes L1 and L2. However, one of the checkout lanes L1 and L2 can be eliminated. In this case, the remaining checkout lane fully occupies an operator for article registration.

In each embodiment, the checkout device is used for registering articles sold in a supermarket. However, this device can be also used for article registration in a field such as a distribution industry and the like which manages a large number of articles.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A checkout device comprising:

a conveying section for conveying an article in one direction;

an optical scanner for scanning the article conveyed by said conveying section with a scanning light beam to read an article code affixed thereto, said optical scanner having a variable scanning range, which scanning range includes at least a side of the article, to which the scanning light beam is applied; and a registration processing section for registering the article based on the article code read by said optical scanner;

wherein said registration processing section includes a control section which detects physical features of the article conveyed by said conveying section, said physical features including a code position on the article at which an article code is affixed to the article, and which controls the scanning range of said optical scanner to be optimized for reading the article code affixed to the article based on a conveying position and the detected physical features of the article;

wherein said control section includes:

a video camera for capturing an image within a predetermined area into which the article is conveyed by said conveying section to produce image data representing the captured image;

an image processor which processes the image data produced by said video camera to detect the article and extract the physical features thereof;

a light source that emits light which is applied to the predetermined area in an oblique direction and which spreads to form a bright line extending across the predetermined area; and wherein said image processor includes a height measuring device which measures a height of the article based on a position difference determined from the image data produced by said video camera and located between a bright line formed by part of the light projected on an upper surface of the article and a bright line formed by part of the light projected on a surface of said conveying section outside the article.

2. A checkout device according to claim 1, wherein said image processor includes a detector which detects the article and extracts at least a size, placed position, and bar code position of the article as the physical features.

3. A checkout device according to claim 1, wherein said conveying section includes:

a first conveyor for conveying an article placed thereon; and a second conveyor for conveying, via said optical scanner, the article supplied from said first conveyor.

4. A checkout device according to claim 3, wherein said registration processing section includes a speed controller which independently controls the speeds of said first and second conveyors.

5. A checkout device according to claim 1, wherein said registration processing section further includes a first supplemental register section, having a data base containing items of feature data each representing a preset number of features of an article, which first supplemental register section searches the data base for feature data representing features which are sufficiently similar to the physical features extracted by said image processor when said optical scanner fails to read the article code, identifies the article based on the results of searching, and registers the identified article.

6. A checkout device according to claim 5, wherein said registration processing section further includes:

a supplemental inputting device for inputting an article code with respect to an article which is not identified by said first supplemental register section; and a second supplemental register section which registers the article identified by the article code input by said supplemental inputting device.

7. A checkout device according to claim 5, wherein said first supplemental register section includes a feature registering device for obtaining, from the data base, feature data of the article identified by the article code which is successfully read by said optical scanner, for detecting a difference between the features represented by the feature data and corresponding features extracted by said image processor, and for changing the feature data in the data base to additionally represent the detected different feature.

8. A checkout device according to claim 5, wherein said registration processing section further includes:

a removing mechanism for removing from said conveying section an article which is not identified by said first supplemental registering means; and an article table for receiving the article removed by said removing mechanism.

9. A checkout device according to claim 8, wherein said registration processing section further includes an article stacker for receiving an article which is not removed from said conveying section by said removing mechanism.

10. A checkout device according to claim 8, further comprising a subsidiary conveying section, arranged in parallel with said first-mentioned conveying section, for conveying an article having no article code to said article table.

11. A checkout device according to claim 1, wherein said registration processing section includes:

an instruction inputting device for inputting start and end instructions of article registration;

a counter for counting a number of articles conveyed into a predetermined area and a number of registered articles after the start instruction is input by said instruction inputting device; and a completion detecting device for detecting completion of article registration by confirming that the numbers of conveyed articles and registered articles counted by said counter are equal to each other after the end instruction is input by said instruction inputting device.

12. A checkout device according to claim 11 wherein said registration processing section further includes an additional counter for counting the numbers of conveyed articles and registered articles when the start instruction is input by said instruction inputting device before completion of article registration is detected by said completion detecting device.

* * * * *